UNITED STATES PATENT OFFICE.

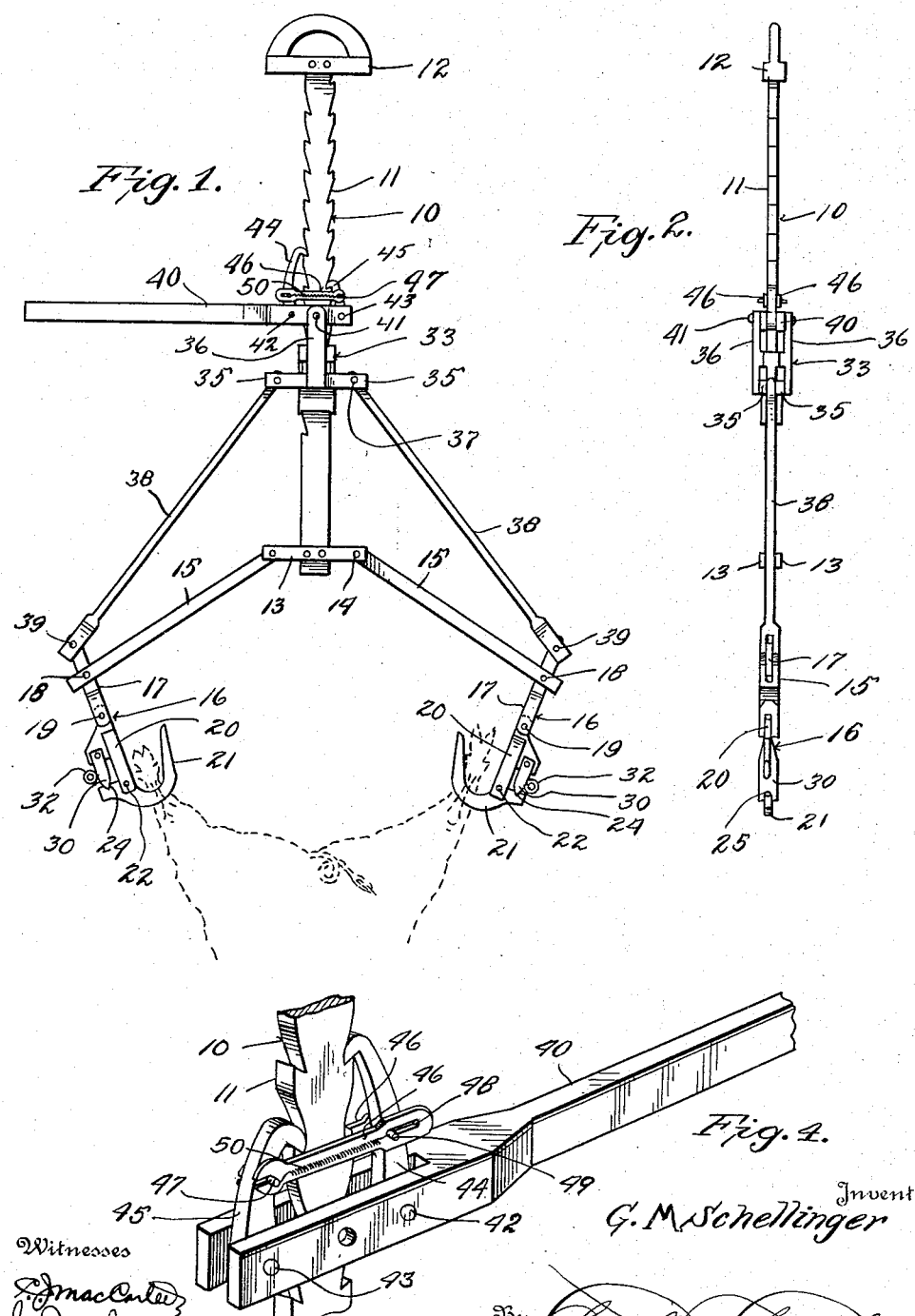

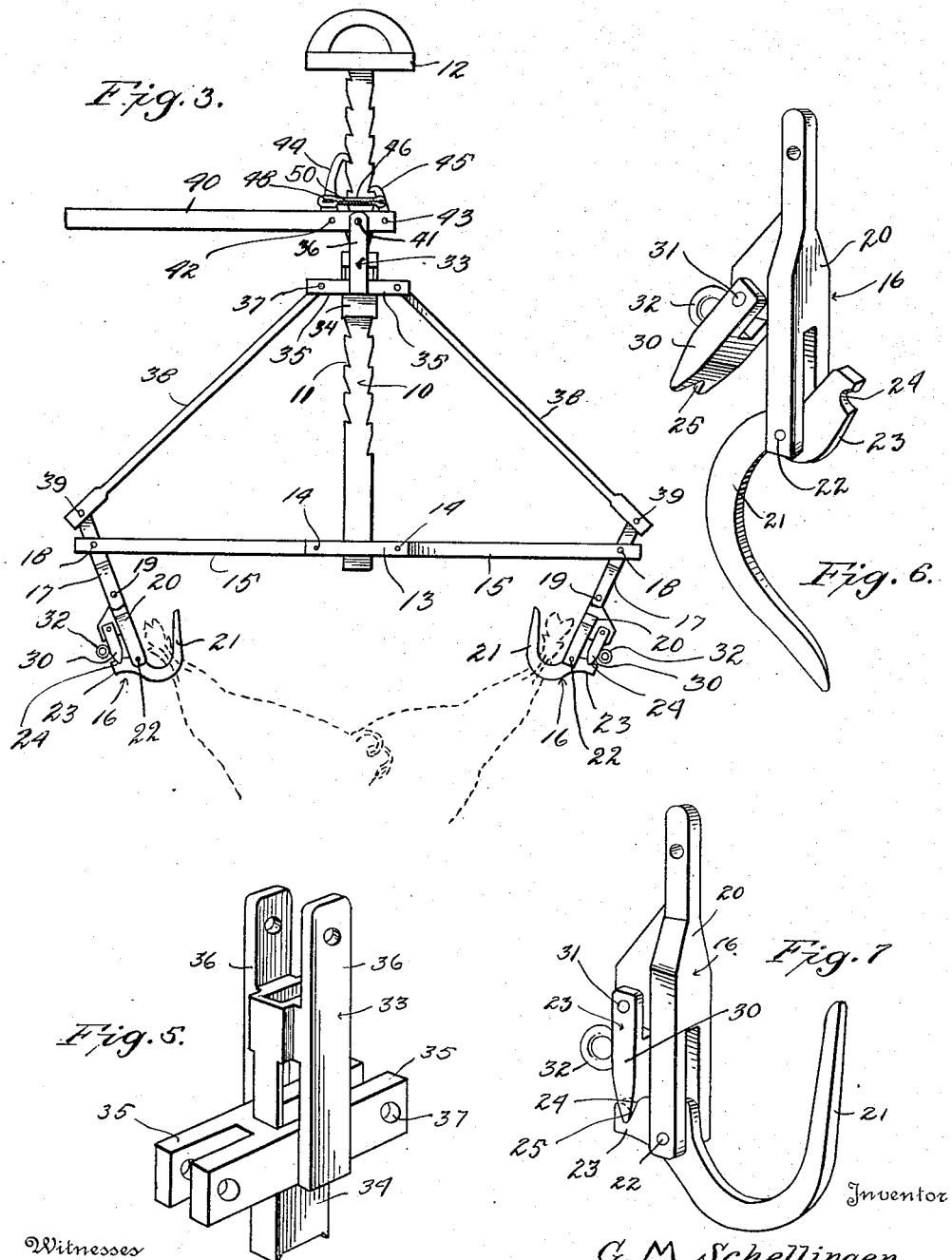

GRANT M. SCHELLINGER, OF DOWNING, WISCONSIN.

GAMBREL.

1,172,489.  Specification of Letters Patent.  Patented Feb. 22, 1916.

Application filed March 2, 1915. Serial No. 11,541.

*To all whom it may concern:*

Be it known that I, GRANT M. SCHELLINGER, a citizen of the United States, residing at Downing, in the county of Dunn, State of Wisconsin, have invented certain new and useful Improvements in Gambrels; and I do hereby declare the following to be a full, clear, and exact description of the invention, such as will enable others skilled in the art to which it appertains to make and use the same.

This invention relates to devices for handling the carcasses of slaughtered animals, and has for its object the provision of a gambrel for suspending the carcass of an animal by its hind legs so that it may be properly dressed with convenience and ease, the device applying tension upon the legs for stretching them apart.

An important object is the provision of a device of this character which is capable of supporting either large or small animals with equal ease.

Another object is the provision of novel lever actuated means whereby the device is moved to accomplish the stretching, the actuating device automatically locking itself at every step of its movement.

Still another object is the provision of novel means engageable with the hamstrings or tendons of the animal for supporting it, this means being releasable by a catch for disengaging the animal from the device when the dressing is completed.

A further object is the provision of a device of this character which will be comparatively simple and inexpensive in manufacture, efficient and durable in service, easy in operation and a general improvement of the art.

With these and other objects and advantages in view, the invention consists in the novel construction and arrangement of parts to be hereinafter more fully described and claimed and illustrated in the accompanying drawing, in which—

Figure 1 is a front elevation of my device showing a carcass engaged therewith, Fig. 2 is a side elevation thereof, Fig. 3 is a front elevation showing the parts moved to more widely separate the carcass supporting arms, Fig. 4 is a perspective view on a larger scale of the actuating lever applied to a fragment of the notched bar, Fig. 5 is a perspective view of the sliding sleeve and its associated parts, Fig. 6 is a perspective view of the hamstring engaging hook in its released position, and Fig. 7 is a similar view showing the hook in its locked position.

Referring more particularly to the drawing the numeral 10 designates the main bar of my device which is provided upon its sides with a plurality of upwardly inclined teeth 11. At its upper end, the bar 10 has secured thereon, as by rivets, a handle 12 which may be engaged by any suitable means for elevating the device when a carcass is engaged therewith. Secured upon the lower end of the bar 10 is a member 13 which has the ends of its opposite arms bifurcated and pivotally receiving as shown at 14 arms 15 which are bifurcated upon their lower ends.

Connected with the lower ends of the arms 15 are members designated as a whole by the numeral 16 which are adapted for engagement with the hamstrings of a carcass. Each of the members 16 comprises an arm 17 pivoted intermediate its ends as shown at 18 within the bifurcation in the end of the arm 15 and forked at its lower end. Within the lower forked end of each of the arms 17 is pivoted as shown at 19 a member 20 which is forked at its lower end as shown for the reception of a hook 21 which is pivoted within the fork as shown at 22. The hook 21 terminates in a lug 23 which is notched adjacent its end as shown at 24 for engagement with the notched end 25 of a keeper 30 pivoted at 31 upon the member 20 and provided with a finger engaging ring 32. The hooks 21 are adapted to be engaged with the hamstrings of the carcass to be supported. It will be observed that weight upon the hooks will force the notched lugs 23 firmly into engagement with the notched ends of the keepers 30 which will maintain the hooks securely in their proper positions.

In order that the legs of a carcass suspended from the hooks 21 may be stretched apart, I provide a slidable member designated as a whole by the numeral 33 disposed upon the bar 10. This member comprises a sleeve 34 rectangular in cross section, encircling the bar 10 and having laterally extending ears 35 and upstanding ears 36 extending in parallel relation to and spaced from the bar 10. Pivoted as shown at 37 between the ears 35 are arms 38 which are pivotally connected at their lower forked ends as shown at 39 with the upper ends of the arms 17.

In order that the slidable member 33 may be moved upwardly upon the bar 10, for moving the hook carrying arms 15 outwardly, and stretching the carcass, I provide a novel lever arrangement comprising a lever 40 having one end formed as a handle and its other end forked as shown, and pivoted as shown at 41 intermediate the arms of the fork upon the ears 36 formed on the member 33. Pivoted within the fork of the lever 40 upon each side of the pivot 41, as shown at 42 and 43 are upwardly extending pawls 44 and 45 which are connected by links 46 pivoted upon pins 47 extending from the pawl 45 and slotted as shown at 48 for engagement with pins 49 extending from the pawl 44. Coil springs 50 are connected with each of the pins 47 and 49 whereby the pawls 44 and 45 will be urged into engagement with the teeth 11 on the bar 10.

The operation of the device is as follows: The hooks 21 are engaged with the hamstrings of a carcass to be suspended and the keepers 30 are moved so that their notched ends 25 will engage the notches 24 in the lugs 23 for holding the hooks 21 in such position that the hamstrings cannot be disengaged therefrom. The entire device is then hoisted by any suitable means attached to the handle 12 so that the carcass will be supported above the floor or ground. In order to stretch the legs of the carcass apart, the lever 40 is worked up and down, whereupon the pawls 44 and 45 will successively engage successive teeth 11 on each side of the bar 10 and consequently pull the sliding member 33 upwardly. This movement will by virtue of the arms 38 pull the arms 15 upwardly upon their pivots 14, thus moving the hook members 16 farther apart. As each pawl engages a tooth 11, it serves as the fulcrum for the next movement of the lever. As the lever 40 is moved upwardly, the pawl 45 serves as the fulcrum and the pawl 44 is carried upwardly and by virtue of the springs 50 will engage the next tooth 11 on its side of the bar 10. Upon downward movement of the lever 40, the pawl 44 serves as the fulcrum and the pawl 45 is carried upwardly. As the lever 40 is connected with the ears 36 on the member 33, the member 33 is moved upwardly at each stroke of the lever. When it is desired to release the carcass from the members 16, as for instance when the skinning or dressing is completed, the operator grasps the finger rings 32 and pulls outwardly on the keepers 30, whereupon the hooks 21 will swing downwardly upon their pivots 22 and allow the carcass to drop from the device.

From the foregoing description and a study of the drawing it will be apparent that I have thus provided a simple, novel, inexpensive and highly efficient gambrel whereby either large or small carcasses may be suspended and held in a stretched position to facilitate dressing.

It will be readily understood that I reserve the right to make various changes in the form, construction and arrangement of parts without departing from the spirit of the invention or limiting the scope of the subjoined claims.

Having thus described my invention I claim:

1. A gambrel comprising a bar, diverging arms pivoted upon the lower end thereof, hook members pivoted upon the lower ends of said arms, a sleeve slidable on said bar and connected with the upper ends of the hooks, and lever actuated means for moving said sleeve upwardly upon said bar.

2. A gambrel comprising a bar, diverging arms pivoted upon the lower end thereof, members pivotally connected with the free ends of said arms, pivoted hooks carried at the lower ends of said members, releasable keepers engaging said hooks for maintaining them in operative position, and means movable on said bar, and connected with the hooks for moving the same apart.

3. A gambrel comprising a bar provided with teeth, arms pivoted upon the lower end of said bar and carrying hooks, and means for moving said arms outwardly; said means comprising a sleeve slidable upon said bar, arms pivoted upon said sleeve and with the hooks, and means carried by said sleeve and operable to engage said teeth successively for moving said sleeve upwardly.

4. A gambrel comprising a bar provided with teeth, arms pivoted on the lower end thereof, hook members carried by said arms, and means for moving said arms outwardly comprising a sleeve slidable on said bar, arms connected with said sleeve and said arms, a lever pivoted upon said sleeve, and pawls on said lever engaging said teeth successively when said lever is moved up and down.

In testimony whereof, I affix my signature, in the presence of two witnesses.

GRANT M. SCHELLINGER.

Witnesses:
H. J. ELLSWORTH,
EDW. C. WAGNER.